United States Patent
Steely, Jr. et al.

(10) Patent No.: US 7,340,565 B2
(45) Date of Patent: Mar. 4, 2008

(54) SOURCE REQUEST ARBITRATION

(75) Inventors: Simon C. Steely, Jr., Hudson, NH (US); Gregory Edward Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 514 days.

(21) Appl. No.: 10/755,919

(22) Filed: Jan. 13, 2004

(65) Prior Publication Data

US 2005/0154831 A1    Jul. 14, 2005

(51) Int. Cl.
*G06F 9/00* (2006.01)
*G06F 9/38* (2006.01)
*G06F 13/00* (2006.01)

(52) U.S. Cl. .................... 711/130; 711/118; 711/117; 711/100; 711/146; 711/141; 712/217; 712/216; 712/1

(58) Field of Classification Search ............ None
See application file for complete search history.

(56) References Cited

U.S. PATENT DOCUMENTS

| | | | |
|---|---|---|---|
| 5,197,132 A | 3/1993 | Steely, Jr. et al. | |
| 5,222,224 A | 6/1993 | Flynn et al. | |
| 5,404,483 A | 4/1995 | Stamm et al. | |
| 5,420,991 A * | 5/1995 | Konigsfeld et al. | 711/150 |
| 5,491,811 A * | 2/1996 | Arimilli et al. | 711/144 |
| 5,519,841 A | 5/1996 | Sager et al. | |
| 5,625,829 A | 4/1997 | Gephardt et al. | |
| 5,651,125 A * | 7/1997 | Witt et al. | 712/218 |
| 5,721,855 A | 2/1998 | Hinton et al. | |
| 5,802,577 A | 9/1998 | Bhat et al. | |
| 5,829,040 A | 10/1998 | Son | |
| 5,845,101 A | 12/1998 | Johnson et al. | |
| 5,875,467 A | 2/1999 | Merchant | |
| 5,875,472 A | 2/1999 | Bauman et al. | |
| 5,958,019 A | 9/1999 | Hagersten et al. | |
| 6,032,231 A | 2/2000 | Gujral | |
| 6,055,605 A | 4/2000 | Sharma et al. | |
| 6,081,887 A | 6/2000 | Steely, Jr. et al. | |
| 6,085,263 A | 7/2000 | Sharma et al. | |
| 6,108,737 A | 8/2000 | Sharma et al. | |
| 6,134,646 A | 10/2000 | Feiste et al. | |
| 6,151,671 A | 11/2000 | D'Sa et al. | |
| 6,209,065 B1 | 3/2001 | Van Doren et al. | |

(Continued)

FOREIGN PATENT DOCUMENTS

EP    1162542 A1 *  12/2001

OTHER PUBLICATIONS

M. Lipasti, C. Wilkerson, and J. Shen. Value locality and load value prediction. In Proceedings of the 7th ASPLOS, Boston, MA, Oct. 1996.*

(Continued)

*Primary Examiner*—Sanjiv Shah
*Assistant Examiner*—Sam Dillon

(57) ABSTRACT

Multiprocessor systems and methods are disclosed. One embodiment may comprise a plurality of processor cores. A given processor core may be operative to generate a request for desired data in response to a cache miss at a local cache. A shared cache structure may provide at least one speculative data fill and a coherent data fill of the desired data to at least one of the plurality of processor cores in response to a request from the at least one processor core. A processor scoreboard arbitrates the requests for the desired data. A speculative data fill of the desired data is provided to the at least one processor core. The coherent data fill of the desired data may be provided to the at least one processor core in a determined order.

26 Claims, 5 Drawing Sheets

U.S. PATENT DOCUMENTS

| | | | |
|---|---|---|---|
| 6,275,905 B1* | 8/2001 | Keller et al. | 711/141 |
| 6,286,090 B1 | 9/2001 | Steely, Jr. et al. | |
| 6,289,419 B1* | 9/2001 | Takahashi | 711/141 |
| 6,301,654 B1 | 10/2001 | Ronchetti et al. | |
| 6,317,811 B1 | 11/2001 | Deshpande et al. | |
| 6,345,342 B1 | 2/2002 | Arimilli et al. | |
| 6,349,382 B1 | 2/2002 | Feiste et al. | |
| 6,356,918 B1 | 3/2002 | Chuang et al. | |
| 6,408,363 B1 | 6/2002 | Lesartre et al. | |
| 6,412,067 B1 | 6/2002 | Ramirez et al. | |
| 6,457,101 B1 | 9/2002 | Bauman et al. | |
| 6,535,941 B1 | 3/2003 | Kruse | |
| 6,553,480 B1 | 4/2003 | Cheong et al. | |
| 6,574,712 B1 | 6/2003 | Kahle et al. | |
| 6,591,348 B1 | 7/2003 | Deshpande et al. | |
| 6,594,821 B1 | 7/2003 | Banning et al. | |
| 6,611,900 B2* | 8/2003 | Patel et al. | 711/145 |
| 6,615,343 B1 | 9/2003 | Talcott et al. | |
| 6,633,960 B1 | 10/2003 | Kessler et al. | |
| 6,633,970 B1* | 10/2003 | Clift et al. | 712/217 |
| 6,651,143 B2 | 11/2003 | Mounes-Toussi | |
| 6,775,749 B1* | 8/2004 | Mudgett et al. | 711/146 |
| 2001/0055277 A1 | 12/2001 | Steely, Jr. et al. | |
| 2002/0009095 A1 | 1/2002 | Van Doren et al. | |
| 2002/0099833 A1 | 7/2002 | Steely, Jr. et al. | |
| 2002/0099913 A1 | 7/2002 | Steely, Jr. | |
| 2002/0146022 A1 | 10/2002 | Van Doren et al. | |
| 2002/0194290 A1 | 12/2002 | Steely, Jr. et al. | |
| 2002/0194436 A1 | 12/2002 | McKenney | |
| 2002/0199067 A1* | 12/2002 | Patel et al. | 711/145 |
| 2003/0069902 A1 | 4/2003 | Narang et al. | |
| 2003/0145136 A1 | 7/2003 | Tierney et al. | |
| 2003/0195939 A1 | 10/2003 | Edirisooriya et al. | |
| 2005/0027941 A1* | 2/2005 | Wang et al. | 711/121 |
| 2005/0144399 A1* | 6/2005 | Hosomi | 711/145 |

OTHER PUBLICATIONS

J. Chang, J. Huh, R. Desikan, D. Burger, G. Sohi. Using Coherent Value Speculation to Improve Mulitprocessor Performance. Aug. 8, 2003. ISCA 2003.*

S. Kaxiras and J. R. Goodman. Improving CC-NUMA performance using instruction-based prediction. In Performance Computer Architecture, pp. 161-170, Jan. 1999.*

D. Lenoski et al. The Stanford Dash Multiprocessor. IEEE Computer, pp. 63-79, Mar. 1992.*

M. M. K. Martin, D. J. Sorin, H. W. Cain, M. D. Hill, and M. H. Lipasti. "Correctly implementing value prediction in microprocessors that support multithreading or multiprocessing." In Proc. of the 34th Intl. Symp. on Microarchitecture, pp. 328-337, Dec. 2001.*

S. Gopal, T. N. Vijaykumar, J. E. Smith, and G. S. Sohi. Speculative versioning cache. Technical Report 1334, Computer Sciences Department, University of Wisconsin-Madison, Jul. 1997.*

Kozyrakis, C.E. Vector IRAM: ISA and Micro-architecture. IEEE Computer Elements Workshops, Vail, CO, Jun. 21-24, 1998.*

M. Cintra, J. F. Martnez, and J. Torrellas. Architectural support for scalable speculative parallelization in shared-memory multiprocessors. In Proceedings of the 27th Annual International Symposium on Computer Architecture, Jun. 2000.*

Rajiv Gupta. The Fuzzy Barrier: a mechanism for high speed synchronization of processors. Proceedings of the third international conference on Architectural support for programming languages and operating systems. Apr. 3-6, 1989.*

Sato, T.; Ohno, K.; Nakashima, H. A mechanism for speculative memory accesses following synchronizing operations. Parallel and Distributed Processing Symposium, 2000. IPDPS 2000. Proceedings. 14th International.*

Stets, R., Barroso, L., Gharachorloo, K. and Ravishankar, M. Managing Complexity in the Piranha Server-Class Processor Design. Complexity Effective Design Workshop, ISCA, Goteborg, Sweden, Jun. 2001.*

Vijaykumar et al. Speculative Versioning Cache. IEEE Transactions on parallel and distributed systems. vol. 12. No. 12. Dec. 2001.*

Gharachorloo, et al., "Memory Consistency and Event Ordering in Scalable Shared-Memory Multiprocessors", Computer Systems Laboratory, Stanford University, CA 94305, pp. 1-14.

Gharachorloo, et al., "Architecture and Design of AlphaServer GS320", pp. 1-16.

* cited by examiner

SOURCE REQUEST ARBITRATION

CROSS REFERENCE TO RELATED APPLICATIONS

This application is related to the following commonly assigned co-pending patent applications entitled: "COHERENT SIGNAL IN A MULTI-PROCESSOR SYSTEM," Ser. No. 10/756,636; "MULTI-PROCESSOR SYSTEMS AND METHODS FOR BACKUP FOR NON-COHERENT SPECULATIVE FILLS," Ser. No. 10/756,637; "CACHE SYSTEMS AND METHODS FOR EMPLOYING SPECULATIVE FILLS," Ser. No. 10/756,638; "REGISTER FILE SYSTEMS AND METHODS FOR EMPLOYING SPECULATIVE FILLS," Ser. No. 10/756,644; "SYSTEMS AND METHODS FOR EXECUTING ACROSS AT LEAST ONE MEMORY BARRIER EMPLOYING SPECULATIVE FILLS," Ser. No. 10/756,639; "MULTI-PROCESSOR SYSTEM UTILIZING SPECULATIVE SOURCE REQUESTS," Ser. No. 10/756,640; "MULTI-PROCESSOR SYSTEM RECEIVING INPUT FROM A PRE-FETCH BUFFER," Ser. No. 10/756,535; "SYSTEMS AND METHODS FOR EMPLOYING SPECULATIVE FILLS," Ser. No. 10/755,938; "CONSISTENCY EVALUATION OF PROGRAM EXECUTION ACROSS AT LEAST ONE MEMORY BARRIER," Ser. No. 10/755,534, all of which are filed contemporaneously herewith and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads or writes to a memory location it receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

SUMMARY

One embodiment of the present invention may comprise a multiprocessor system. The system may comprise a plurality of processor cores. A given processor core may be operative to generate a request for desired data in response to a cache miss at a local cache. A shared cache structure may provide at least one speculative data fill and a coherent data fill of the desired data to at least one of the plurality of processor cores in response to a request from the at least one processor core. A processor scoreboard may arbitrate the requests for the desired data. A speculative data fill of the desired data may be provided concurrently to the at least one processor core. The coherent data fill of the desired data may be provided to the at least one processor core in a determined order.

Another embodiment of the present invention may comprise a method of arbitrating multiple requests to a desired cache line at a node having multiple processors. Requests for a desired cache line may be received from a plurality of requesting processors at a shared cache structure. A speculative data fill of the cache line may be received at the shared cache structure. The speculative data fill of the cache line may be provided concurrently to each of the requesting processors. A coherent data fill of the cache line may be received at the shared cache structure. The coherent data fill of the cache line may be provided to the requesting processors in a determined order.

In accordance with yet another embodiment of the invention, a multiprocessor system may comprise a plurality of processing nodes in a multiprocessor system. At least one processing node may comprise a plurality of processors. Each processor may be operative to generate a local request for a data fill of a cache line. A shared cache structure may generate a system request to the system in response to respective local requests from at least one requesting processor. The shared cache structure may receive a speculative data fill from the system, and provide the speculative data fill to each processor that generates a local request. The shared cache structure may receive a coherent data fill of the cache line from the system in response to the system request and provide the coherent data fill to each processor that generates a local request in a determined order.

In accordance with still another embodiment of the present invention, a processing node in a multiprocessor system may comprise a first means for executing data and a second means for executing data. The system may also comprises means for providing speculative data fills and coherent data fills in response to a source request from one of the first means for executing and the second means for executing. The system may further comprise means for arbitrating between requests by the first means for executing and the second means for executing such that coherent data fills are provided to the first means for executing and the second means for executing in a determined order.

DETAILED DESCRIPTION

This disclosure relates generally to the arbitration of conflicting source requests for a desired cache line at a multiprocessor node. The systems and methods may allow a shared cache structure at the node to continue providing speculative data fills of the desired cache line to the various processors at the node, while providing a subsequent coherent data fill in accordance with an establish cache coherency protocol. The conflicting requests are recorded in a processor scoreboard and filled in a determined order of priority to maintain coherency. For example, they can be filled in the order they are received. A processor can employ a speculative data fill of the requested cache line to continue instruction execution, while it is waiting for its request to be filled. Once the coherent data fill is provided to the processor, the source can continue execution if the speculative data fill is the same as the coherent data fill or backup and re-execute instructions if the speculative data fill is different from the coherent data fill.

Figure 1:
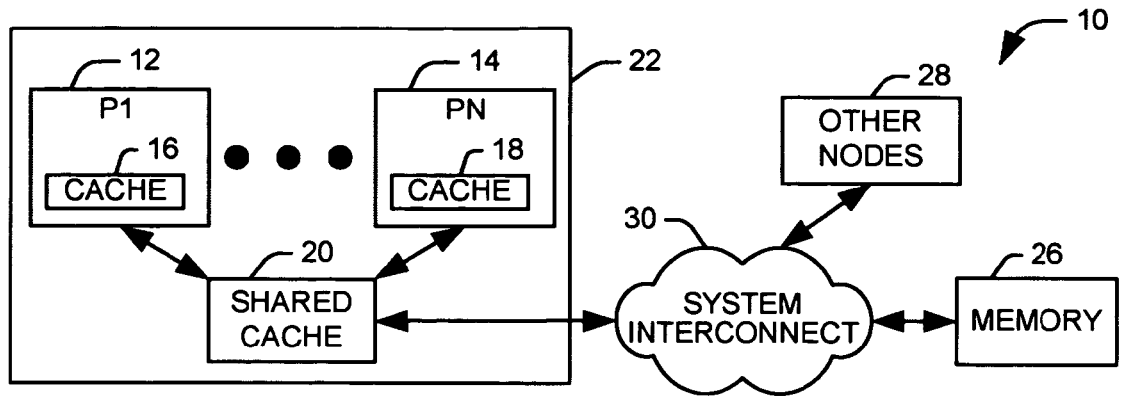
FIG. 1 depicts a system that utilizes source request arbitration at a shared cache.

FIG. 1 depicts an example of a system 10 that utilizes source request arbitration at a shared cache as part of a dual level cache coherency structure. The system 10 illustrates a multiprocessor environment that includes a plurality of processor cores 12 and 14 (indicated as P1 through PN, where N is a positive integer (N>1)). Each of the processor cores 12-14 includes at least one corresponding cache 16 and 18. For purposes of brevity, each of the respective caches 16-18 are depicted as unitary memory devices, although they may include a plurality of memory devices or different cache levels. Each of the caches 16-18 contains a plurality of cache lines. Each cache line has an associated address that identifies corresponding data stored in the line. The cache lines can also include information identifying the state of the data for the respective lines.

The system 10 also includes a shared cache 20, operatively connected to the plurality of processor cores 12-14. The processor cores 12-14 and the shared cache 20 define a node 22 in the multiprocessor system. The system employs the individual caches 16-18 and the shared cache 20 to store blocks of data, referred to herein as "memory blocks" or "data fills." A memory block or data fill can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches 16-20.

The system further includes a memory 26, which can be implemented as a globally accessible aggregate memory. For example, the memory 26 can include one or more memory storage devices (e.g., dynamic random access memory (DRAM)). Like the caches, the memory stores data as a series of memory blocks or memory lines. The memory 26 defines another node within the system 10, and the system can further comprise one or more other nodes, indicated schematically at 28. The various nodes (e.g., 22, 26, and 28) can communicate with each other via requests and corresponding responses through a system interconnect 30. The system interconnect 30 can be implemented as a switch fabric or a hierarchical switch. The other nodes 28 can correspond to one or more other multiprocessor systems connected to the system interconnect 30, such as through an appropriate interconnect interface (not shown).

The system 10 implements a dual level cache coherency protocol to manage the sharing of memory blocks among and within the various nodes so as to guarantee coherency of data. A node level implementation of the cache coherency protocol maintains coherency within each node. The node level implementation of the cache coherency protocol utilizes a plurality of states to identify the state of each memory block stored in a respective cache line within the node, as well as the priority of each of the processor cores 12-14 to a cache line requested over the system interconnect 30. A cache line can take on any of a number of states relative to the processor cores 12-14 with the node 22. These states are summarized in the following table:

TABLE 1

| STATE | DESCRIPTION |
|---|---|
| I | Invalid - The cache line is not present in the processor cache. |
| S | Shared - The cache line is valid and unmodified by the caching processor. Other processors may have valid copies. |
| E | Exclusive - The cache line is valid and unmodified by the caching processor. The caching processor has the only valid cached copy. |
| M | Modified - The cache line is valid and has been modified by the caching processor. The caching processor has the only valid cached copy. |

Primarily, the cache coherency protocol establishes rules for transitioning between states, such as if data is read from or written to the shared cache 20 or one of the individual caches 16-18. The system 10 can utilize any of a number of suitable cache coherency protocols for a node level implementation, including a broadcast based protocol, a directory based protocol, or a null based directory protocol.

As used herein, a processor core that issues a local source request, such as a read or write request, defines a source processor. When a source processor (e.g., 12) requires a copy of a given memory block, it first requests the memory block from its individual cache (e.g., 16) by identifying the address associated with the memory block. If the data is found at the individual cache, the memory access is resolved without communication with the shared cache 20. Where the requested memory block is not found in the individual cache 16, referred to as a cache miss, the source processor 12 can generate a local request for the memory block from the remainder of the node 22, including the shared cache 20. The request can identify an address associated with the requested memory block and the type of request or command being issued by the requester.

If the memory block is available at the node 22 (e.g., one of the caches 16-20 has a shared, exclusive, or modified copy of the memory block), it is provided to the source processor 12. The state of the cache line can change according to the type of request and the previous state of the cache line. For example, a read request on a shared cache line will not result in a change in the state of the cache line, as a copy of the cache line is simply shared with the source processor. If the cache line is exclusive to another processor, however, a read request will require the cache line to change to a shared state with respect to the source processor and the providing processor. A write request will change the state of the cache line to modified with respect to the requesting processor, and invalidate any shared copies of the cache line at other processors.

If the desired memory block is not available at the node, it can be requested via a system source request through a system level of the cache coherency protocol. The shared cache 20 provides a system source request to the system through the system interconnect 30. This request is received at one or more other nodes, and the requesting node 22 can be provided with one or more data fills representing copies of the requested memory block. Some of the data fills can be speculative data fills. A speculative data fill is a data fill that may or may not be the latest version of the memory block. A speculative fill data can be provided to the requesting processor core to allow it to execute several thousands of program instructions ahead prior to receiving a coherent copy of the requested memory block.

Subsequent data fills can be provided to the requesting node until a coherent signal is received indicating one of the data fills that is coherent. Any non-coherent data fills received after the speculative data fill can be ignored. Alternatively, if a subsequent data fill is different from the speculative fill used by the source processor to continue execution, the processor can backup and re-execute program instructions using the subsequent data fill. This may be the case if it is determined that a subsequent fill is more likely coherent than the original speculative data fill employed by the processor to continue execution.

Once the coherent signal is received, the coherent fill is provided to the source processor 12. The source processor 12 determines whether the current speculative fill employed by the processor is the same as the coherent data fill. If the coherent data fill is different from the speculative fill, the processor can back up and re-execute program instructions with the new data. If the coherent data fill is the same as the speculative fill, the processor can continue execution, thus mitigating latency caused by the processor remaining in an idle state until a coherent version of the requested memory block is received.

It will be appreciated that multiple processors within a node can request a particular cache line during the execution of a system source request. In such a case, an entry corresponding to each requesting processor is entered into a processor scoreboard at the shared cache 20 to determine the priority of the processor requests. While the system retrieves a coherent fill, processors having entries within the processor scoreboard can be provided with any speculative fills that arrive. Once the coherent fill is available, it is provided to the processors according to the order in which their entries are listed in the processor scoreboard. For example, the processor scoreboard can operate in a first-in-first-out (FIFO) arrangement in which the coherent fills are provided in the order in which the local requests arrived. The entries can be grouped to allow multiple copies of the coherent fill to be provided concurrently to multiple processors. For example, multiple read requests can be serviced simultaneously, as neither processor will modify the cache line.

The shared cache 20 continues to provide the coherent fill to the listed processors until every processor has received the coherent fill or until the node no longer has sufficient permission to continue filling requests. For example, if the node 22 lacks write permission, it can fill read requests to the cache line, but will need to make a second system level write request to fill a subsequent write request. Similarly, if another node within the system takes ownership of the cache line (e.g., the cache line enters an exclusive or modified state with respect to another node), the node can no longer fill requests and will need to reobtain permission via another system level request.

Figure 2:
FIG. 2 depicts an example of cache line entry in a shared cache.

FIG. 2 illustrates an example of cache line entry 40 in a shared cache. In the illustrated example, the cache line entry 40 is part of a shared cache operating in a directory-based cache coherency protocol at the node level of a multi-level cache coherency protocol. It will be appreciated that other cache coherency protocols can be utilized at the node level of a multi level system, and that the specific fields within a shared cache can vary with the selection of a cache coherency protocol.

A coherency state (CS) field 42 indicates the cache coherency state of the line of data at the system level. The coherency state field 42 retains a coherency state of the cache line (e.g., modified, shared, exclusive, or invalid) associated with the shared cache. The coherency state field 42 is indicative of the privileges of the node to the cache line against the other nodes in the system. For example, if the field indicated that the node is in a shared state, the shared cache contains a valid copy of the data with read permission. A write request to the system would be necessary, however, to obtain write permission to the data for a processor within the node.

A tag field 44 contains the memory address of the cache line, which serves as an identifier for the cache line. A directory (DIR) field 46 indicates the coherency state of the data within the node level cache coherency protocol. In the illustrated example, a directory entry can have two formats, with the format of the entry being indicated by a coherency subfield. When the coherency subfield indicates that the cache line is in an exclusive or modified state with respect to a processor within the node, the directory entry lists the present owner (e.g., the processor core having the coherent copy of the state) in a second subfield. When the coherency subfield indicates that the cache line is in a shared state with respect to the processors within the cache, no processor has a copy of the cache line more recent than that stored at the shared cache, making an owner field unnecessary. A data field 48, contains the data associated with the cache line.

Figure 3:
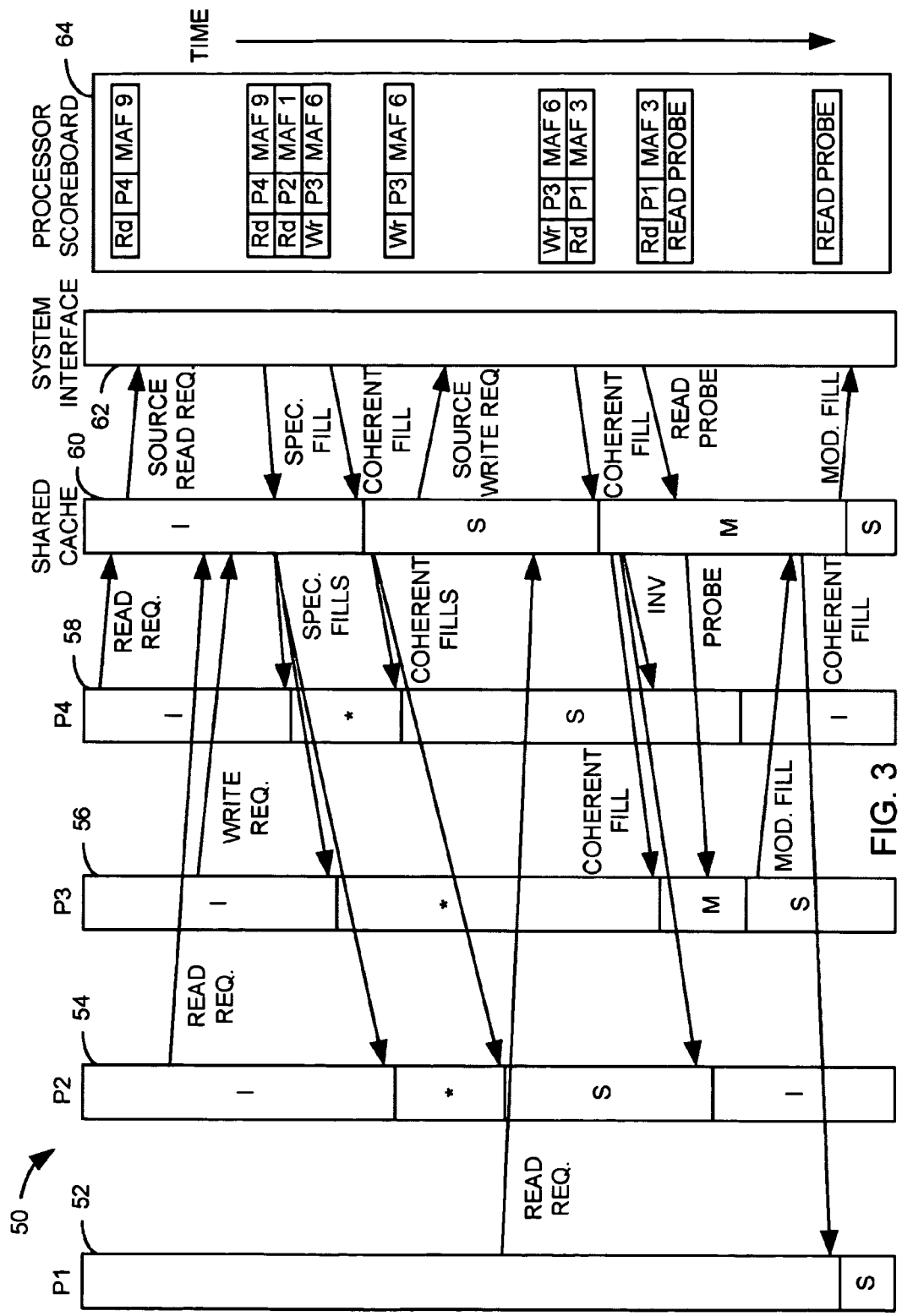
FIG. 3 depicts a state diagram of several components associated with a multiprocessor node.

FIG. 3 illustrates a state diagram 50 of a node including four processors, 52-58, a shared cache 60, and a system interconnection 62. The processors 52-58 have been given numerical labels for the simplicity of reference, with the leftmost processor 52 being labeled processor one (P1) and the rightmost processor 58 being labeled processor four (P4). It will be appreciated that these labels are arbitrary and should not be taken to indicate any substantive difference among the processors 52-58. FIG. 3 illustrates various interrelationships between requests and responses and state transitions that can occur for a given memory address in different memory devices or caches. A representation of a processor scoreboard 64 associated with the shared cache is also illustrated to demonstrate how the scoreboard changes dynamically in response to these communications within the node. In the example, time flows in the direction of an arrow labeled "TIME." The illustration focuses on the arbitration of multiple requests to a desired cache line with the illustrated node.

In the illustrated example, no valid copy of a desired cache line is present at the node, so the cache line begins in an invalid state with respect to the shared cache 60 and the processors 52-58. A local read request for the desired cache line comes from processor four 58, which is determined to be a cache miss by the shared cache 60. An examination of the outstanding missed address files (MAFs) associated with the shared cache indicates no node level MAF entry associated with the desired cache line. Accordingly, a new MAF entry is created for the desired cache line and a system source read request is sent to the system for the desired cache line. An entry recording the requesting processor, the request type, and a MAF number associated with the requesting processor is then made to the processor scoreboard 64 at the node level MAF.

A local read request is then received at the shared cache 60 from processor two (P2) 54, followed closely by a local write request from processor three (P3) 56. The processor scoreboard 64 is updated to include these requests. A speculative fill then arrives at the shared cache 60. The speculative fill is sent to all processors recorded in the processor scoreboard. In the illustrated example, processors two, three, and four all receive the speculative fill. The speculative fill allows the requesting processors (e.g., 54, 56, and 58) to continue to execute instructions associated with the desired memory block with a data fill that is believed to be coherent until a coherent data fill can be obtained. A copy of the speculative fill can be saved in individual missed address (MAF) files associated with the requesting processors.

After a short time, the shared cache 60 receives a coherent fill from the system. When the shared cache 60 receives the coherent fill, the cache line assumes a shared state with respect to the node associated with the shared cache in the system level of the cache coherency protocol. A coherent signal accompanies the coherent fill of the cache line provided to the shared cache 60. The coherent signal provides an indication to the shared cache 60 that the copy provided by the system interconnect 62 is the coherent version of the cache line. The coherent signal can be a structure such as a data packet, or a tag associated with each data fill that is marked to indicate which of the data fills are coherent, or a tag associated with only the coherent version of the cache line. The coherent signal can be a mask or vector that indicated which portions (e.g., data fields, data quantums, data blocks) of a data fill are coherent. Additionally, the coherent signal can be a mask or vector that indicates which of a plurality of responses to a plurality of requests have returned coherent copies. The coherent signal can be sent prior to, after or concurrently with the coherent version of the cache line In the illustrated system, simultaneous requests at a node are resolved according to a first-in-first-out (FIFO) scheme. According, the shared cache 60 provides the coherent fill to groups of one or more processors in the order they appear in the processor scoreboard 64. A group of processors can comprise one or more processors having consecutive local read requests within the processor scoreboard 64, a processor having a write request on the scoreboard, or an external probe for the cache line from another node. In the present example, the first group of requests consists of two read requests, one from processor four and one from processor two. Both processors are provided with the coherent fill of the cache line. The cache line assumes a shared state at the node level of the cache coherency protocol with respect to both of the receiving processors. Once the processors have been provided with the requested fill, their entries are removed from the processor scoreboard.

When a requesting processor (e.g., 58) receives a coherent fill of the cache line from the shared cache, a comparison of the coherent fill and the earlier, speculative fill is performed to determine the coherency of the speculative fill. If the coherent data fill is different from the speculative fill, the processor 58 can back up to its state prior to the speculative fill and start executing again with the coherent data. If the coherent data fill is the same as the speculative fill, the processor can continue execution. This will occur for each processor that receives a speculative fill during the pendency of the system source request. If no speculative fill is received, the processor simply processes the coherent fill normally.

The next request in the processor scoreboard is a write request, which cannot be fulfilled by the shared cache 60 as it has only a shared copy of the cache line and lacks write permission. Accordingly, the shared cache 60 issues a system source write request for the desired cache line. While the shared cache 60 awaits a response to the write request, a local read request is received from processor one 52. The read request is added to the processor scoreboard. A speculative fill (not shown) of the cache line can be provided to processor one in response to the read request. A coherent fill is then provided to the shared cache 60, along with an indication that the node associated with the shared cache has write permission to the data (e.g., an acknowledgement that one or more other nodes have invalidated their shared copies). In response, the cache line assumes a modify state with respect to the node.

The shared cache 60 provides the coherent fill to processor three 56 and sends invalidation requests to processors two and four 54 and 58 to invalidate their shared copies of the cache line. At the node level, the cache line assumes a modify state with respect to processor three 56, while assuming an invalid state with respect to processors two and four 54 and 58. The write request associated with processor three 56 is then removed from the processor scoreboard. An external probe from another node within the system requesting a shared copy of the cache line is then received at the shared cache 60. The probe is recorded as a request in the processor scoreboard in a manner similar to a request internal to the node.

It will be appreciated that in light of the modification of the cache line by processor three 56, the copy stored at the shared cache 60 may no longer be a coherent copy. Before the shared cache 60 can continue filling the requests in the processor scoreboard 64, it is necessary to obtain the modified copy of the cache line from processor three 56. The shared cache 60 sends a probe to processor three 56 requesting a modified copy of the cache line. When the processor 56 finishes its write to the cache line, it passes the modified cache line back to the shared cache 60 and relinquishes its write permission to the data. In other words, the cache line assumes a shared state with respect to the third processor.

Once the modified copy of the cache line is retrieved, the shared cache 60 provides a shared copy of the cache line to processor one 52 in response to its read request. The request from processor one 52 is then removed from the processor scoreboard. Finally, the shared cache 60 processes the external probe to the cache line. A copy of the cache line is sent to the requesting node, and the cache line assumes a shared state with respect to the node associated with the shared cache 60. The probe request is then removed from the processor scoreboard, leaving it empty, and the MAF entry for the cache line is retired. If additional requests remained in the scoreboard after the external probe, the shared cache 60 would continue to fill the requests in the order received, obtaining appropriate permissions to the cache line as necessary.

Figure 4:
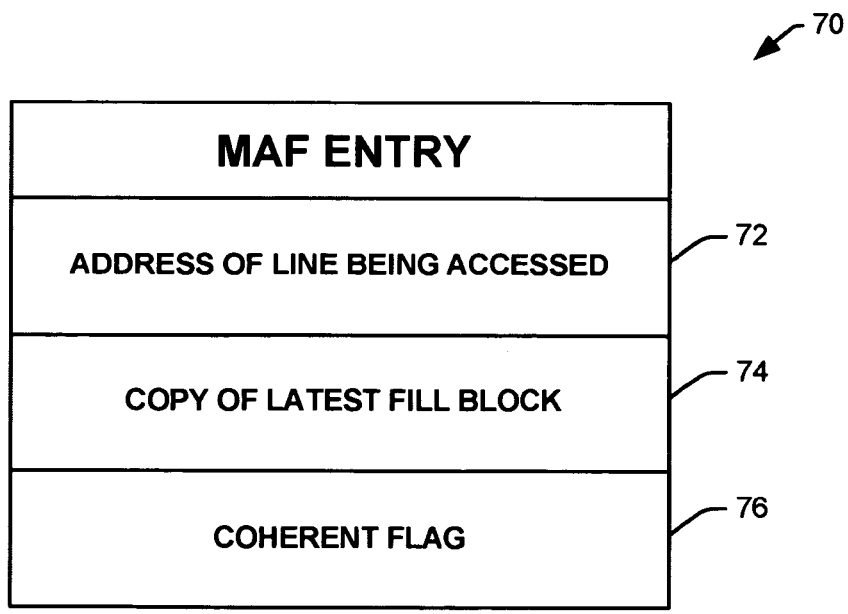
FIG. 4 depicts a block diagram of a processor level missed address file entry.

FIG. 4 illustrates a block diagram of a processor level missed address file (MAF) entry 70 that can be employed to track data fills received in response to a source request. A MAF entry is generated by a source processor each time the source processor registers a cache miss at its associated local cache. The MAF entry 70 contains fields associated with outstanding source requests corresponding to respective cache lines. The MAF fields can include the cache line address being requested 72, the copy of the latest fill block 74 returned by the system and a flag 76 that provides an indication of whether or not the coherent signal has been received. Other entries or fields can be employed to maintain information associated with a given cache line broadcast request.

Each time a new fill is received, the source determines if the data fill in the MAF entry 70 is the same as the speculative fill utilized by the source to continue execution. If the new fill is different, the source replaces the previous data fill with the new fill. If the subsequent data fill is different from the speculative fill used by the source processor to continue execution, the processor may backup and re-execute program instructions. This may be the case if it is determined that a subsequent fill is more likely coherent than the original fill employed by the processor to continue execution.

The source also checks to see if the state of the coherent flag 76 has changed, indicating that the coherent signal has been received. Once the coherent flag 76 changes state, the source can compare the coherent fill (e.g., the last fill prior to the signal) 74 stored in the MAF entry 70 with the speculative fill used to continue execution of the processor to determine if execution should continue or whether the processor needs to re-execute the program instructions.

Figure 5:
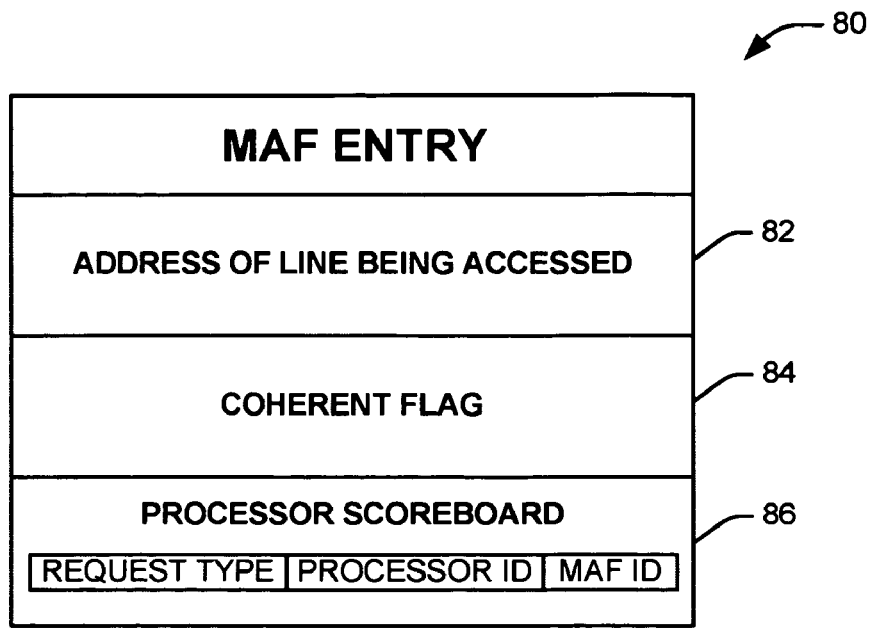
FIG. 5 depicts a block diagram of a node level missed address file entry.

FIG. 5 illustrates a block diagram of a node level missed address file (MAF) entry 80 that can be employed to track multiple requests to a cache line from processors at the node. A MAF entry 80 is generated by the shared cache structure each time a shared cache structure requests a data fill from the system in response to a source request from an associated processor. The MAF entry 80 contains fields associated with outstanding source requests corresponding to a respective cache line. The MAF fields can include the cache line address being requested 82, a flag 84 that indicates if a coherent fill has been received, and a processor scoreboard 86 that records requests to the cache line from the various processors within the node. Other entries or fields can be employed to maintain information associated with a given cache line request.

Each time the shared cache issues a source request to the system for a desired cache line, a MAF entry (e.g., 80) is created to track the source request and arbitrate requests to the received cache line. While the request is pending, additional requests to the desired cache line can be generated by other processors at the node. These requests are added as entries to the processor scoreboard 86 in the order in which they are received. A given processor scoreboard entry contains a processor identifier, the nature of the request (e.g., read or write), and a MAF identification number for the processor level MAF entry associated with the requesting processor.

The system can return one or more speculative data fills in response to the source request by the shared cache. The one or more speculative data fills are provided to each processor having a request recorded in the processor scoreboard. Any processors submitting requests after a speculative data fill is received can also be provided with the speculative data fill. Once a coherent data fill is available, it is provided to the processors in defined groups, with the groups receiving the coherent data fill in the in the order in which they are listed on the processor scoreboard. A given group can comprise one or more consecutive read requests on the processor scoreboard, a single write request, or a single external probe from another node in the system. The members of a group receive the coherent fill concurrently, and are then removed from the processor scoreboard. This continues until the scoreboard is empty, an external probe is processed, or it is necessary to reissue a source request to obtain write permission to the cache line.

Figure 6:
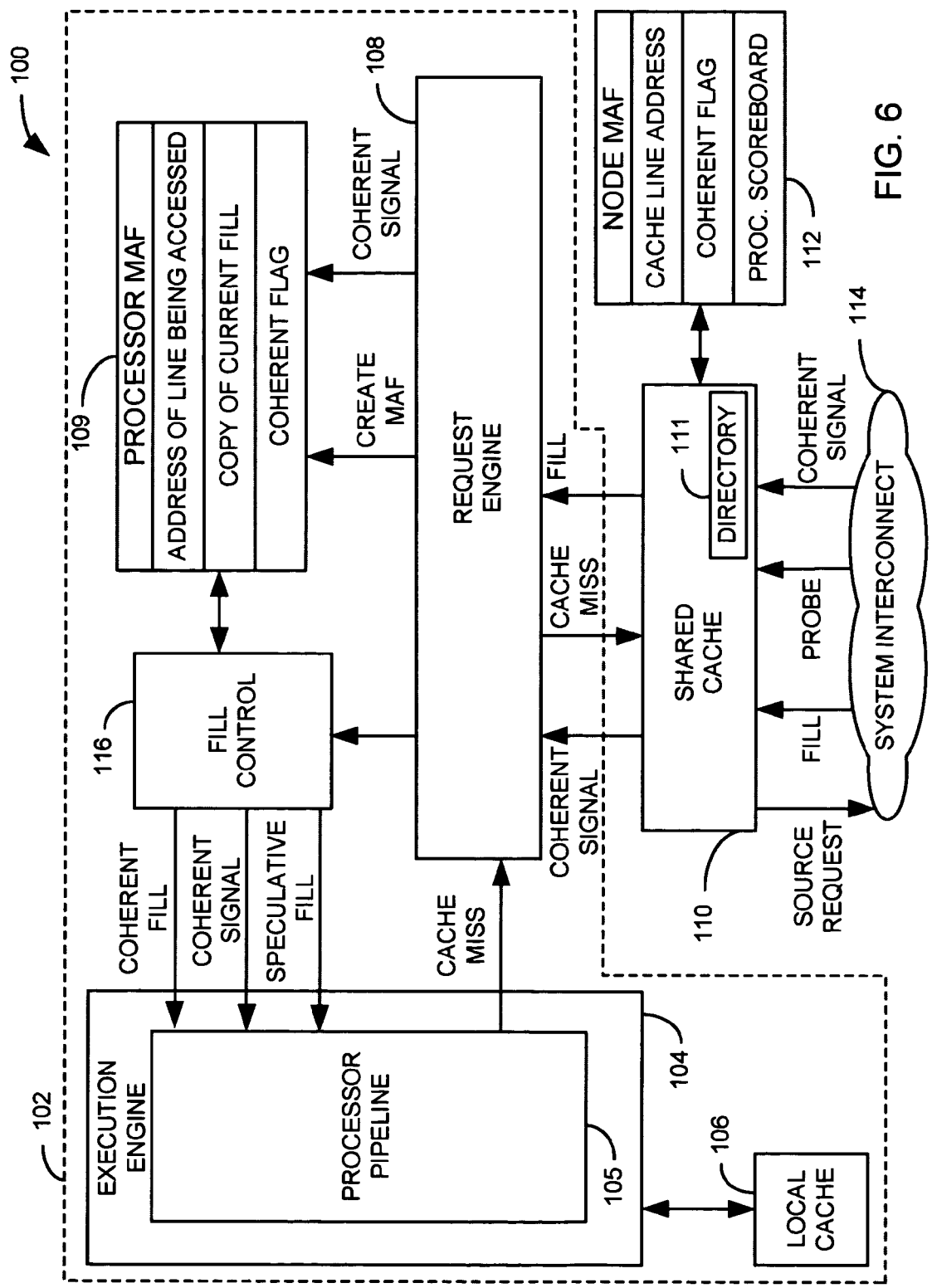
FIG. 6 illustrates a schematic diagram of a node.

FIG. 6 illustrates a schematic diagram of a node 100, showing a processor core 102 and a shared cache 110. It will be appreciated that node 100 having a shared cache will comprise additional processor cores (not shown), operatively connected to the shared cache and similar in design to the illustrated core 102. The core 102 includes an execution engine 104 that executes instructions associated with a processor pipeline 105. During a load or store instruction, the execution engine 104 searches a local cache 106 to determine if the cache line resides in the local cache 106. If the cache line does not reside in the local cache 106, the execution engine 104 initiates a miss to a request engine 108. The request engine 108 creates a processor level missed address file (MAF) 109 entry and provides a local request to a shared cache structure 110 to determine if the shared cache contains a copy of the cache line and if the shared copy of the cache line has been requested by another processor (not shown) within the node. The processor level MAF file 109 can be implemented as a table, an array, a linked list or other data structure programmed to manage and track requests for each cache line. A given entry in the processor level MAF file 109 includes fields that identify, for example, the address of the data being requested, the type of request, and information received in response to the request. The request engine 108 employs the processor level MAF file 109 to manage requests issued by the request engine 108 as well as responses to such requests.

In the illustrated example, the cache coherency protocol at the node level is a directory based cache coherency protocol. It will be appreciated, however, that the node level cache coherency protocol can utilize any of a number of cache coherency protocols, including broadcast based protocols and null-directory protocols. A directory 111 associated with the shared cache 110 is first searched to determine if a copy of the desired cache line is present at the node. The shared cache 110 then queries an associated node level missed address file (MAF) 112 to determine if there is a MAF entry outstanding for the request cache line. The node level MAF file 112 can be implemented as a table, an array, a linked list or other data structure programmed to manage and track requests for each system level requested cache line. An entry in the node level MAF file 112 includes fields that identify, for example, the address of the data being requested, a processor scoreboard that arbitrates the priority of requests from the processors within the node, and a coherent flag that determines when a coherent copy of requested data has been received. The shared cache 110 employs the node level MAF file 112 to manage requests from its associated processors as well as to track data obtained to fill such requests.

If the directory 111 contains a record of the cache line and there is no outstanding node level MAF entry for the cache line, the shared cache retrieves the location of a coherent copy of the node from the directory. Once a copy is located, it is retrieved for the requesting processor in accordance with the node level cache coherency protocol. If the directory 111 contains neither a record of the cache line, nor a node level MAF entry outstanding for the cache line, the shared cache 110 does not have a coherent copy of the desired cache line. The shared cache 110 generates a system source request over the system via a system interconnect 114. A MAF entry is created at the node level The system can respond to the source request with one or more fills of the requested cache line, including speculative fills. Any speculative fills received at the shared cache are forwarded to the requesting processor, as well as any processors recorded in the processor scoreboard. At the processor 102, the speculative fill is stored in a copy of latest fill block field in the processor level MAF entry 109 by the request engine 108. A fill control component 116 retrieves a copy of the speculative fill from the processor level MAF entry 109 and provides the speculative fill to the processor pipeline 105. The processor pipeline 105 employs the speculative fill to continue execution of program instructions. In the illustrated example, the processor 102 is provided with a single speculative fill. Alternatively, however, the shared cache 110 can provide additional speculative fills to processors listing in the processor scoreboard as they are received at the node 100. As new fills are received, the request engine 108 continues storing the new fills in the copy of latest fill block field of the processor level MAF entry 109, overwriting the previous fills when they are different from the latest fill. If the subsequent data fill is different from the speculative fill used by the processor 102 to continue execution, the processor pipeline 105 can backup and re-execute program instructions. This may be the case if it is determined that a subsequent fill is more likely coherent than the original fill employed by the processor to continue execution.

When the shared cache 110 obtains a coherent fill of the data, as indicated by an accompanying coherent signal, the coherent fill is provided to the processors within the node 100 in the order in which they are listed in the processor scoreboard. Since the source processor 102 initiated the source request, it will typically occupy the first position in the processor scoreboard. For the purpose of example, it is assumed that the processor scoreboard operates in a first-in-first-out (FIFO) arrangement to prioritize the various requests to a given cache line. Where consecutive read requests are listed in the scoreboard, their associated processors can be provided with shared copies of the data fill concurrently. It will be appreciated, however, that the processor scoreboard can operate according to other priority schemes. For example, the processor scoreboard can include a priority field giving a numerical priority value for each request and rank them accordingly.

The fill control component 116 monitors a coherent flag field in the processor level MAF entry 109 to determine if the coherent flag has changed state, which is an indication that the coherent signal has been received. Once the coherent signal and coherent fill are received from the shared cache 110, the request engine 108 changes the state of the coherent flag field in the processor level MAF entry 109. The fill control 116 detects the change in the state of the coherent fill and retrieves a copy of the latest fill block, which corresponds to the coherent version of the data fill. The fill control 116 then compares the speculative fill provided to the processor pipeline 105, with the coherent fill. If the coherent data fill is different from the speculative fill, the fill control 116 provides the coherent fill to the processor pipeline 105. The processor pipeline 105 can back up and start executing program instructions again with the new coherent data. If the coherent data fill is the same as the speculative fill, the fill control 116 provides the coherent signal to the processor pipeline 105 indicating that the processor pipeline has already been provided with the coherent data. The processor pipeline 105 can continue execution, until anothercache miss is encountered.

If the directory 111 contains a record of the cache line, but there is an outstanding node level MAF entry for the cache line, the cache line has already been requested by another processor within the node 100. The request is then placed in the processor scoreboard within the outstanding MAF entry used to arbitrate conflicting requests within the node. In lieu of the requested coherent copy of the data, the source processor 102 is provided with a speculative fill. This speculative fill is processed at the processor 102 as described above until the request associated with the processor 102 moves to the top of the processor scoreboard (e.g., the requests having higher priority have been filled). At this point, the source processor 102 is provided with a coherent fill and an accompanying coherent signal.

If the directory 111 contains no record of the cache line, but there is an outstanding node level MAF entry for the cache line, the cache line has likely already been requested by another processor within the node 100, but no fill data has, as of yet, been returned. The request is placed in the processor scoreboard to await a fill of the cache line. If a speculative fill of the cache line is received by the shared cache 110, it is provided to the source processor 102 as well as the other processors having requests listed in the processor scoreboard. The speculative fill is processed at the processor 102 as described above until a coherent fill is returned to the shared cache 110 and the request associated with the processor 102 moves to the top of the processor scoreboard (e.g., the requests having higher priority have been provided with the coherent fill). At this point, the source processor 102 is provided with the coherent fill and an accompanying coherent signal.

Figure 8:
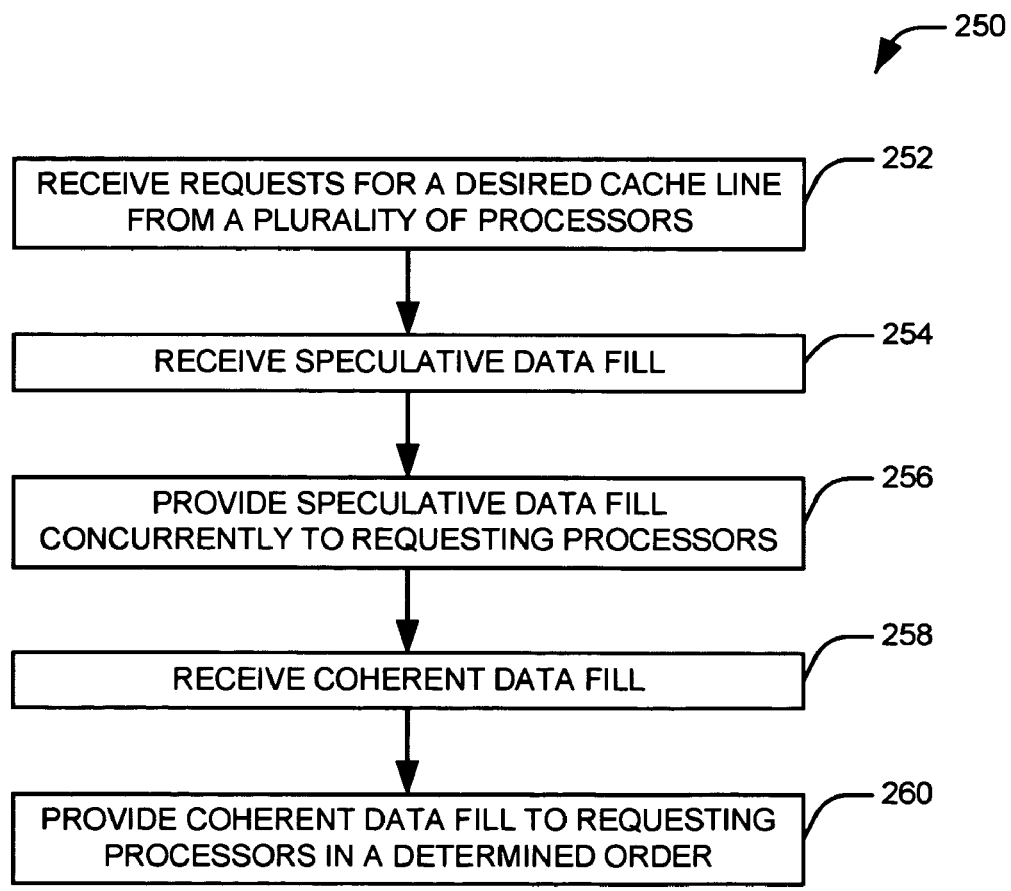
FIG. 8 depicts a flow diagram illustrating another method associated with source request arbitration.
Figure 7:
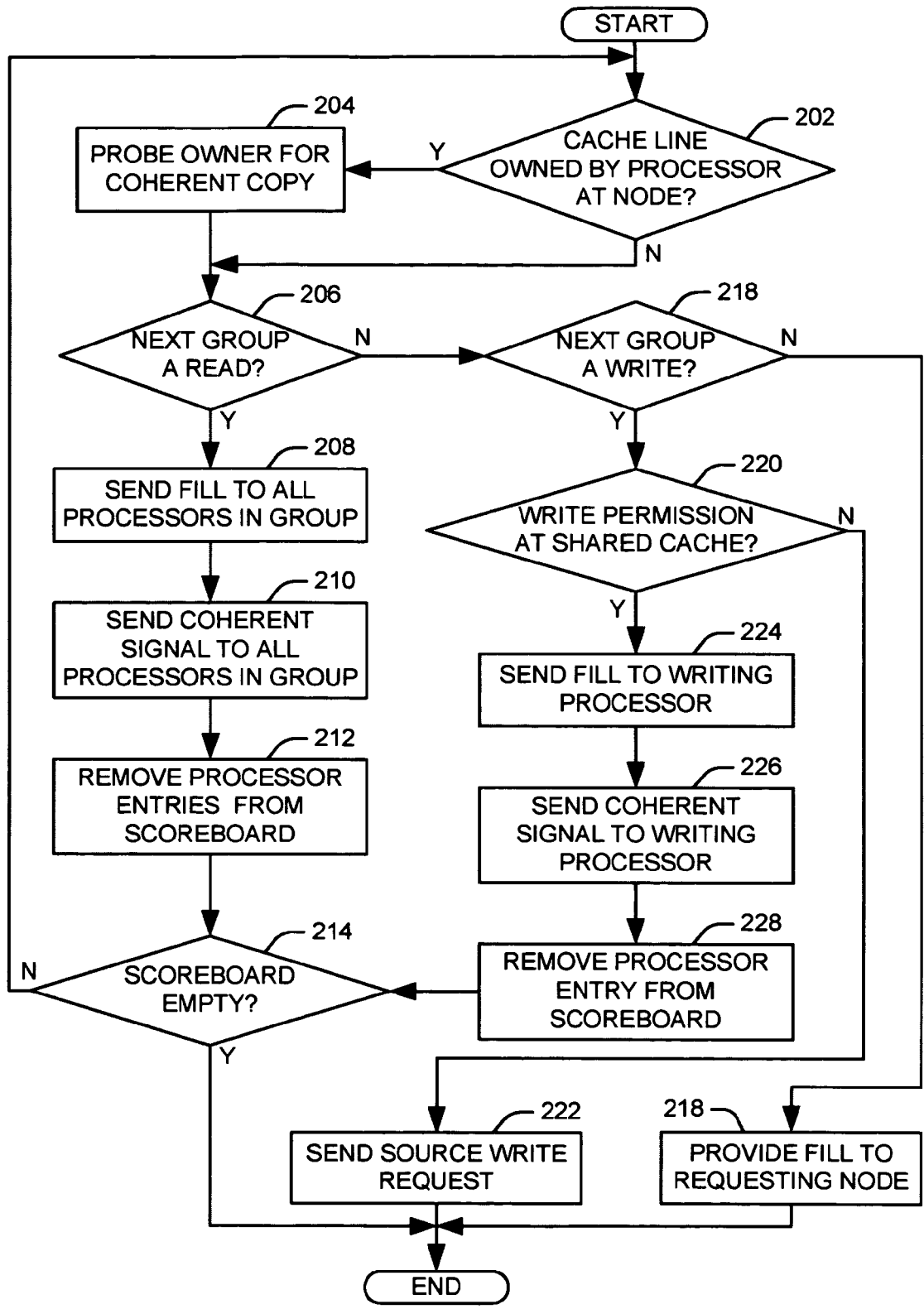
FIG. 7 depicts a flow diagram illustrating a method associated with source request arbitration.

In view of the foregoing structural and functional features described above, certain methods will be better appreciated with reference to FIGS. 7 and 8. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors), or any combination thereof.

FIG. 7 depicts a methodology 200 for arbitrating multiple source requests to a desired cache line at a multiprocessor node using a processor scoreboard. At 202, it is determined if the cache line is owned (e.g., in a modified state) by one of the processors associated with the node. If so, (Y) it is possible that the cache line has been altered by the owning processor, and that the copy located at a shared cache associated with the node is no longer coherent. The methodology proceeds to 204, where the shared cache probes the owner processor to obtain a coherent copy of the cache line. The methodology then advances to 206. If the cache line is not owned by one of the processors associated with the node (N), the methodology advances directly to 206.

At 206, it is determined if the next group of entries on the processor scoreboard represents one or more read requests. A group of entries can comprise one or more consecutive read request entries on the processor scoreboard, a single write request entry, or a single external probe from another node in the system. If the group comprises one or more read request entries (Y), the methodology advances to 208, where each processor having an entry in the group is provided concurrently with a shared copy of the coherent fill. At 210, each processor having an entry within the group is provided with a coherent signal, indicating that the previously provided fill (e.g., at 208) is coherent. Once this is complete, the methodology advances to 212, where the entries associated with the group are removed from the processor scoreboard. The methodology then proceeds to 214.

If the next group of entries does not represent a group of read requests (N), the methodology proceeds to 216. At 216, it is determined if the next group of entries on the processor scoreboard represent a write request. If the next group of entries does not comprise a write request entry (N), the entry is an external probe from another node requesting the cache line. In response to the probe, the methodology advances to 218 to provide a fill of the cache line to the requesting node and then terminates. If the group does consist of a write request entry (Y), the methodology advances to 220, where it is determined if the shared cache has write permission for the cache line. If the shared cache does not have write permission for the cache line, the methodology advances to 222, where the shared cache provides a source write request to the system to obtain write permission for the cache line. The methodology then terminates.

If the shared cache does have write permission for the cache line (Y), the methodology advances to 224, where the writing processor is provided with a copy of the coherent fill along with writing privileges for the cache line (e.g., the cache line assumes a modified state with respect to the writing processor). At 226, the writing processor is provided with a coherent signal, indicating that the previously provided fill (e.g., at 224) is coherent. Once this is complete, the methodology advances to 212, where the entry associated with the writing processor is removed from the processor scoreboard. The methodology then proceeds to 214. At 214, it is determined if the processor scoreboard is empty of further requests. If additional requests remain (N), the methodology returns to 202 to process another group of entries on the scoreboard. If no further requests remain (Y), the methodology terminates.

FIG. 8 illustrates a method 250 of arbitrating multiple requests to a desired cache line at a node having multiple processors. At 252, requests for a desired cache line are received from a plurality of requesting processors at a shared cache structure. At 254, a speculative data fill of the cache line is received at the shared cache structure. At 256, the speculative data fill of the cache line is provided concurrently to each of the requesting processors. At 258, a coherent data fill of the cache line is received at the shared cache structure. At 260, the coherent data fill of the cache line is provided to the requesting processors in a determined order.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multiprocessor system conforming to a cache coherency protocol, the system comprising:
    a plurality of processor cores, at least two processor cores being operative to generate a source request for desired data of a cache line in response to a cache miss at a local cache;
    a shared cache structure that receives at least one speculative data fill by a given one of the processor cores of the multi-processor system that did not generate the source request for the desired data of the cache line and a coherent data fill in response to the source requests from the at least two processor cores for the desired data of the cache line and provides the at least one speculative data fill and the coherent data fill of the desired data to the at least two processor cores, wherein at least one speculative data fill has an undetermined coherency state; and
    a processor scoreboard that arbitrates the requests for the desired data amongst the plurality of processor cores, wherein a speculative data fill of the desired data is provided to each of the at least two processor cores and the coherent data fill of the desired data is provided to each of the at least two processor cores in a determined order wherein a given processor core executes program instructions employing a speculative data fill until a coherent data fill is received, and the processor core re-executes the program instructions if the coherent data fill is different from the speculative data fill.

2. The system of claim 1, wherein the determined order comprises a first-in-first-out (FIFO) arrangement in which groups of at least one request for the desired data are processed at the shared cache structure in the order in which they are recorded in the processor scoreboard.

3. The system of claim 2, wherein a group of read requests comprises at least one read request and a group of write requests consists of one write request.

4. The system of claim 1, wherein the shared cache structure writes an entry to the processor scoreboard in response to a request from a requesting processor.

5. The system of claim 4, wherein the processor scoreboard entry includes an identification value for the requesting processor and an indication whether the source request is a read request or a write request.

6. The system of claim 1, wherein the shared cache structure is operative to provide a source request to the multiprocessor system to obtain at least one data fill of the desired data.

7. The system of claim 6, wherein the system further comprises a node level missed address file (MAF) that stores a MAF entry corresponding to the source request.

8. The system of claim 7, wherein the MAF entry comprises an address associated with the desired data, a coherent flag that indicates if a coherent data fill has been received from the multiprocessor system for the desired data, and the processor scoreboard.

9. The system of claim 6, wherein the multiprocessor system provides a coherent signal to the shared cache structure to indicate that a data fill is a coherent data fill.

10. The system of claim 1, wherein the processor core includes a request engine that generates a processor level missed address file (MAF) entry associated with the cache miss, and the processor level missed address file entry includes a field for storing a speculative data fill and a coherent flag field that indicates if a coherent signal has been received by the processor core from the shared cache structure.

11. A plurality of processing nodes in a multiprocessor system that conforms to a cache coherency protocol, at least one processing node comprising:
    a plurality of processors, each processor operative to generate a local request for a data fill of a cache line in response to a cache miss;
    a shared cache structure that generates a system request to the multiprocessor system in response to respective local requests for the data fill from at least two requesting processors of the plurality of processors, the shared cache structure receiving a speculative data fill from at least one of the plurality of processors of the multiprocessor system, and providing the speculative data fill to the at least two requesting processors that generated a local request, wherein the speculative data fill has an undetermined coherency state; and
    wherein the shared cache structure receives a coherent data fill of the cache line from the multiprocessor system in response to the multiprocessor system request and provides the coherent data fill to each processor that generates a local request in a determined order, and a given processor executes program instructions employing a speculative data fill until a coherent data fill is received, and the processor re-executes the program instructions if the coherent data fill is different from the speculative data fill.

12. The node of claim 11, wherein the node further comprises a queue associated with the shared cache structure that stores the local requests in the determined order.

13. The node of claim 12, wherein the queue operates according to a first-in-first-out (FIFO)) arrangement.

14. The node of claim 11, wherein the shared cache structure receives a coherent signal from the multiprocessor system associated with the coherent data fill that indicates that the coherent data fill is coherent.

15. The node of claim 11, wherein the node further comprises a node level missed address file (MAF) that stores an entry corresponding to the source request.

16. The node of claim 15, wherein the MAF entry comprises an address associated with the cache line, a coherent flag that indicates if a the coherent data fill has been received from the multiprocessor system, and a queue associated with the shared cache structure that stores the local requests in the determined order.

17. A processing node in a multiprocessor system conforming to a cache coherency protocol the system comprising:
 a first means for executing data;
 a second means for executing data;
 means for providing speculative data fills received from at least one processor of the multiprocessor system and coherent data fills in response to source requests for a data fill of a cache line from the first means for executing and the second means for executing, wherein the speculative data fills have an undetermined coherency state; and
 means for arbitrating between concurrent requests for the data fill of the cache line by the first means for executing and the second means for executing such that coherent data fills are provided to the first means for executing and the second means for executing in a determined order, the means for arbitrating receiving the requests for the data fill from the first means for executing and the second means for executing before the means for arbitrating provides a response to a request for the data fill to either of the first means for executing or the second means for executing.

18. The system of claim 17, wherein the means for providing comprises means for providing a coherent signal to the means for arbitrating that distinguishes coherent data fills from speculative data fills.

19. The system of claim 17, wherein the means for arbitrating comprises means for recording the requests from the first means for executing and the second means for executing.

20. The system of claim 17, the means for providing comprising means for storing data that is shared between the first means for executing and the second means for executing.

21. A method of arbitrating multiple requests to a desired cache line at a node having multiple processors in a multiprocessor system that conforms to a cache coherency protocol, comprising:
 receiving at least two requests for a desired cache line from a plurality of requesting processors at a shared cache structure such that the at least two requests are outstanding concurrently, wherein the requesting processors generate the request for the desired cache line in response to a respective cache miss;
 receiving a speculative data fill of the cache line from at least one given processor of the plurality of processors at the shared cache structure, wherein the speculative data fill has an undetermined coherency state;
 providing the speculative data fill of the cache line to the requesting processors in response to the at least two requests;
 receiving a coherent data fill of the cache line at the shared cache structure; and
 providing the coherent data fill of the cache line to the requesting processors in a determined order.

22. The method of claim 21, wherein the method further comprises writing entries corresponding to the received requests to a processor scoreboard associated with the node.

23. The method of claim 22, wherein the method further comprises removing an entry from the processor scoreboard when the coherent data fill has been provided to its corresponding requesting processor.

24. The method of claim 21, wherein the providing of the coherent data fill includes providing the coherent data fill to the requesting processors in the order in which the requests from the requesting processors were received at the shared cache structure.

25. The method of claim 21, wherein the receiving of the coherent data fill at the shared cache structure includes receiving a coherent signal associated with the coherent data fill.

26. The method of claim 21, wherein the providing of the coherent fill includes obtaining a second coherent data fill having associated write privileges.

* * * * *

UNITED STATES PATENT AND TRADEMARK OFFICE
CERTIFICATE OF CORRECTION

PATENT NO. : 7,340,565 B2 Page 1 of 1
APPLICATION NO. : 10/755919
DATED : March 4, 2008
INVENTOR(S) : Simon C. Steely, Jr. et al.

It is certified that error appears in the above-identified patent and that said Letters Patent is hereby corrected as shown below:

In column 15, line 5, in Claim 13, delete "(FIFO))" and insert -- (FIFO) --, therefor.

In column 15, line 15, in Claim 16, after "a" delete "the".

In column 15, line 20, in Claim 17, after "protocol" insert -- , --.

Signed and Sealed this

Fifteenth Day of July, 2008

JON W. DUDAS
*Director of the United States Patent and Trademark Office*